(12) United States Patent
Chen

(10) Patent No.: US 7,944,344 B2
(45) Date of Patent: May 17, 2011

(54) UNIFIED CONTROL DEVICE FOR BICYCLE ACCESSORY

(76) Inventor: Yu-Yu Chen, Taipei (TW)

( * ) Notice: Subject to any disclaimer, the term of this patent is extended or adjusted under 35 U.S.C. 154(b) by 346 days.

(21) Appl. No.: 12/125,934

(22) Filed: May 23, 2008

(65) Prior Publication Data

US 2008/0290999 A1　Nov. 27, 2008

(30) Foreign Application Priority Data

May 25, 2007　(TW) ................ 96208574 U

(51) Int. Cl.
*B62J 3/00* (2006.01)
(52) U.S. Cl. ........ 340/432; 340/475; 340/641; 362/473; 362/475
(58) Field of Classification Search .................. 340/432, 340/463, 465, 466, 468, 471, 473, 475, 539.1, 340/641, 691.1, 691.6, 825.71, 825.72, 825.73; 362/473, 475, 476, 486, 84
See application file for complete search history.

(56) References Cited

U.S. PATENT DOCUMENTS

| 4,290,048 | A | * | 9/1981 | Cutlip et al. | 340/432 |
| 5,418,696 | A | * | 5/1995 | Izzo, Sr. | 362/473 |
| 6,759,947 | B2 | * | 7/2004 | Aceves | 340/432 |
| 7,062,969 | B2 | * | 6/2006 | Ueda | 73/493 |
| 7,495,549 | B2 | * | 2/2009 | Acres | 340/427 |
| 7,729,822 | B2 | * | 6/2010 | Le Gars et al. | 701/29 |
| 2006/0292998 | A1 | * | 12/2006 | Chan et al. | 455/101 |

FOREIGN PATENT DOCUMENTS

EP　　　　1508513 A1 *　2/2005

* cited by examiner

*Primary Examiner* — Toan N Pham
(74) *Attorney, Agent, or Firm* — Leong C. Lei

(57) ABSTRACT

A control device, either installed on a bicycle or carried by a user, communicates with the accessories via radio signals. The control device radiates control signals via its radio transceiver and the control signals are received by the radio transceivers of the accessories. Each accessory has a unique identification code which is encapsulated in the radio control signals so that the individual lamp or lock could be turned on and off or locked and unlocked. On the other hand, accessories such as speed sensor and body sensor could radiates their collected information to the control device which in turn calculates and displays readings such as the speed of the bicycle and the heart beat rate of the rider, etc.

7 Claims, 3 Drawing Sheets

UNIFIED CONTROL DEVICE FOR BICYCLE ACCESSORY

FIELD OF THE INVENTION

The present invention generally relates to the control of bicycles accessories such as lamps and lock, and more particularly to a device for centralized and wireless control of the various accessories of a bicycle.

BACKGROUND OF THE INVENTION

Generally, a bicycle rider would have his or her bicycle installed with lamps, in addition to reflection stickers and plates, so as to provide lighting and therefore to achieve enhanced safety in the night. A conventional bicycle lamp mainly contains, for example as disclosed by the Republic of China, Taiwan, Patent Application Serial Number 84215658, a cover shell, a lamp base, a positioning seat, and a lamp cover, etc. A light bulb is positioned inside the lamp cover, and a laterally operated control switch is provided at an end of the lamp base for adjusting the brightness of the light bulb.

Another common accessory to a bicycle is the lock. There are many locking devices developed in the market. U.S. Pat. No. 6,690,267 discloses a remotely controllable bicycle lock and alarm system including a radio wave processor for receiving a communication from a remote control device. The radio wave processor is coupled to a control circuit. A sound generator, a locking mechanism, and an input/out system are also coupled to the control circuit. The system enables a user to remotely lock and unlock his/her bicycle, and notifies the user of a tampering with his/her bicycle.

Also, a remote locking apparatus for a cabinless, light vehicle is disclosed in U.S. Pat. No. 6,768,219. The remote locking apparatus comprises a portable infrared transmitter, an infrared receiver disposed at an uppermost portion of a vehicle body, a lock actuator for locking and unlocking at least one lock mechanism incorporated in the vehicle body, and a control apparatus for controlling the lock actuator based on the infrared signal received by the infrared receiver.

In U.S. Pat. No. 7,104,091, a bicycle lock is disclosed which can be fastened to a bicycle without any special holding device and which secures the bicycle, the seat support, and the seat. The bicycle lock is combined with a rear light which can only be activated when the safety lock is not closed.

U.S. Pat. No. 7,071,819 discloses a remote control lock operation system which comprises a hand-held remote control transmitter, a receiver, a control unit for determining whether the signal received by the receiver is acceptable and controlling the lock actuator based on the received signal when it is acceptable. The system is capable to unlock a mechanical locking mechanism of the vehicle by a infrared signal, without using the key.

As described above, a bicycle lamp is usually turned on or off by a laterally operated control switch on the lamp base. If more lamps are installed on the bicycle, such as a left-turn signal lamp, a right-turn signal lamp, a back lamp, etc., a user has to operate the control switches of the lamps one by one. In addition, the control switch only provides the adjustment of brightness; it cannot flash the light bulb.

In addition, a user has to separately lock or unlock the bicycle lock manually by a key or by a remote control mechanism described above. In other words, the control and operation of these bicycle accessories is rather inconvenient.

SUMMARY OF THE INVENTION

Therefore, a major objective of the present invention is to provide a novel control device to unify the control of various lamps' states of a bicycle.

Another objective of the present invention is that the novel control device could also lock and unlock a bicycle.

To fulfill the above objects, the present invention provides a unified control device for bicycle assessory. The control device, either installed on a bicycle or carried by a user, communicates with the accessories via radio signals. The control device radiates control signals via its radio transceiver and the control signals are received by the radio transceivers of the accessories. Each accessory has a unique identification code which is encapsulated in the radio control signals so that the individual lamp or lock could be turned on and off or locked and unlocked, and their statuses are displayed on the control device. On the other hand, accessories such as speed sensor and body sensor could radiates their collected information to the control device which in turn calculates and displays readings such as the speed of the bicycle and heart beat rate of the rider, etc.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
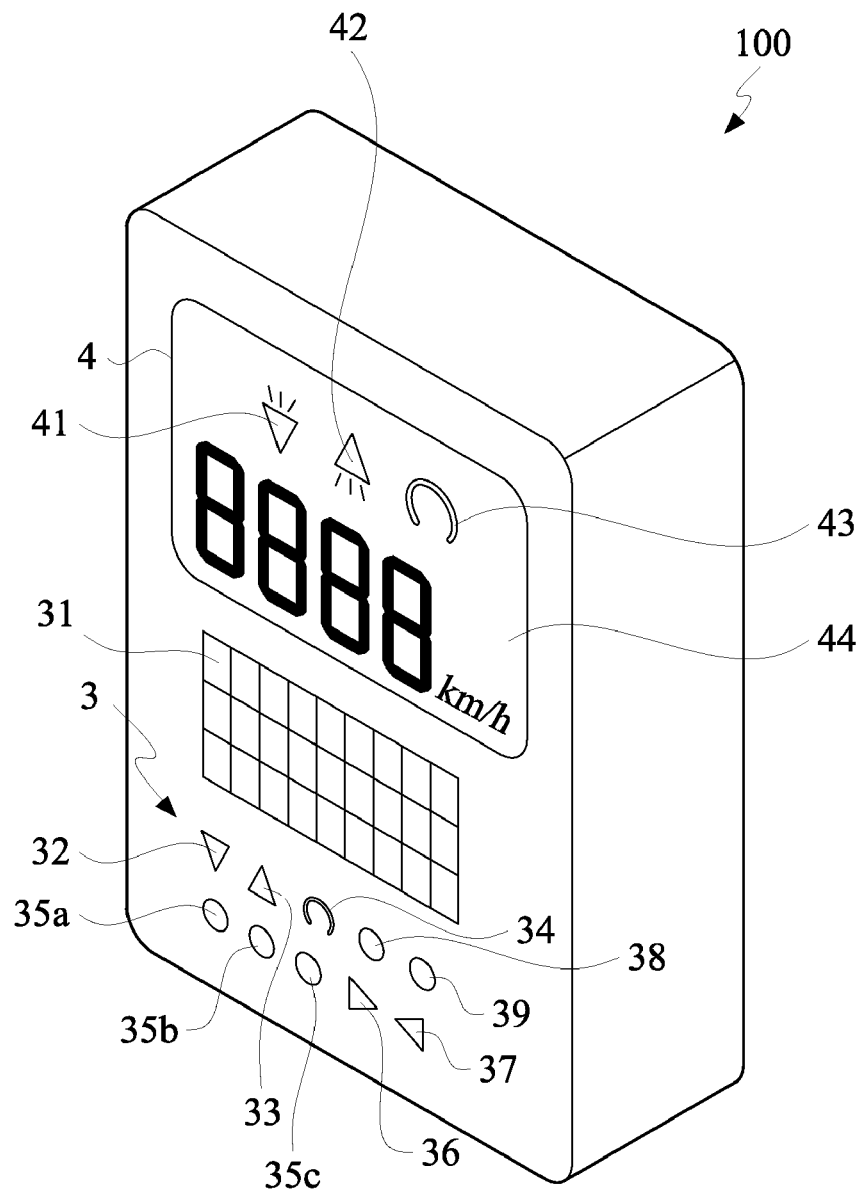
FIG. 1 is a perspective diagram showing a control device constructed according to an embodiment of the present invention.
Figure 2:
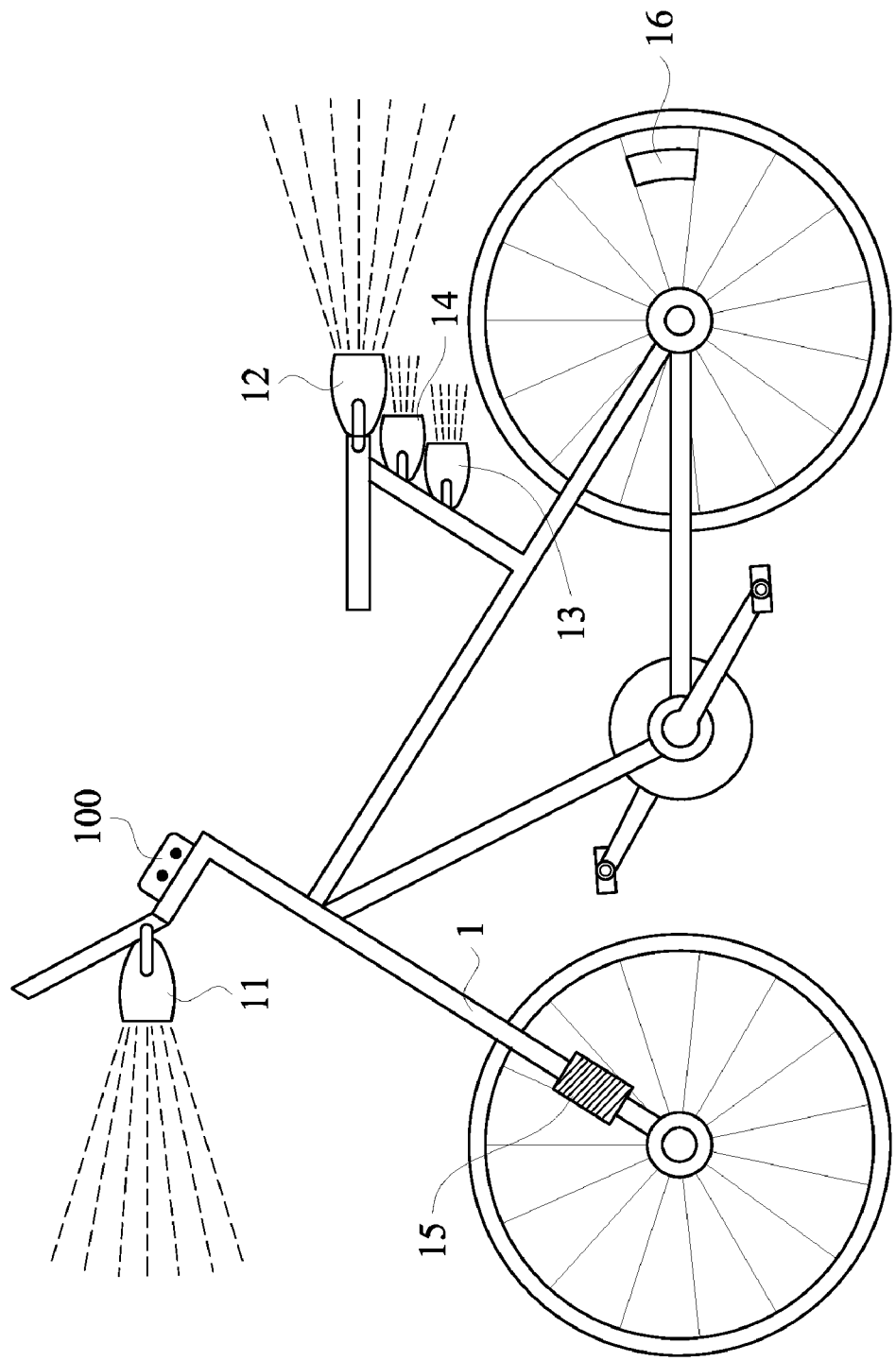
FIG. 2 is a schematic diagram showing the control device of FIG. 1 and various accessories installed on a bicycle.

As shown in FIGS. 1 and 2, a control device 100 according to an embodiment of the present invention is installed on a bicycle 1. The bicycle 1 has a front lamp 11, a back lamp 12, a left-turn signal lamp 13, a right-turn signal lamp 14 and an electronic lock 15. The control device 100 is an independent device having a display unit 4 and a button set 3 on a front surface of the control device 100.

The button set 3 comprises a plurality of numeric key pads 31, a front-lamp control button 32, a back-lamp control button 33, a lock control button 34, a reset button 35a, a set button 35b, a mode button 35c, a left-turn-signal-lamp control button 36, a right-turn-signal-lamp control button 37, a brightness control button 38, and a flash control button 39.

Figure 3:
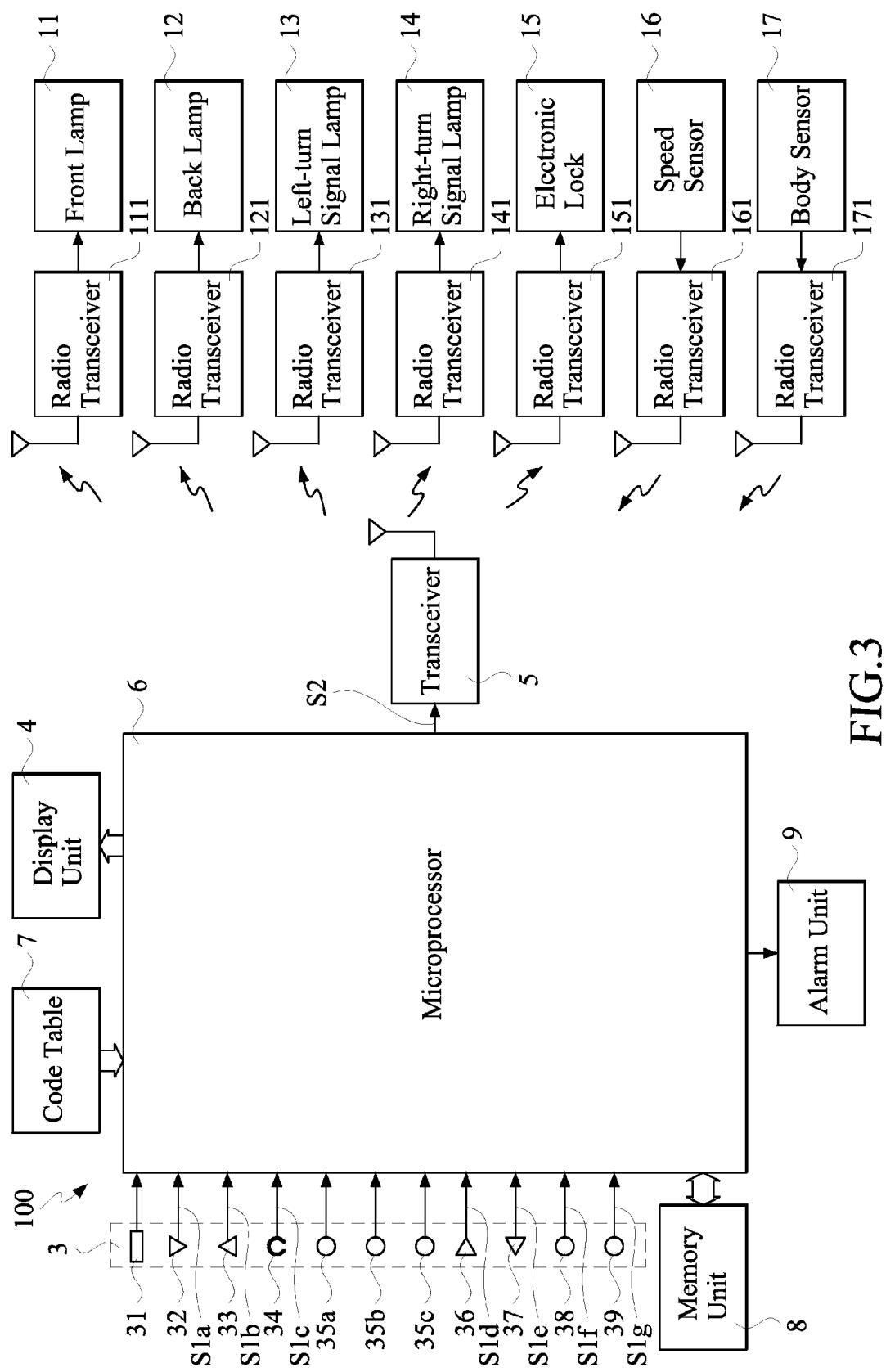
FIG. 3 is a block diagram showing a control circuit of the control device.

As shown in FIG. 3, the control device 100 comprises a radio transceiver 5, a microprocessor 6, a code table 7, a memory unit 8, an alarm unit 9, a speed sensor 16 and a body sensor 17. The microprocessor 6 is connected to and interacted with the display unit 4 and the button set 3. The memory unit 8 for the storage of data and instructions used in the operation of the microprocessor 6, the radio transceiver 5 for sending and receiving radio signals to and from the various accessories (e.g., the lamps, lock, etc.) of the bicycle 1, and the code table 7 for the storage of the identification codes of the controlled lamps and lock, are all connected separately to the microprocessor 6.

The front lamps 11 has a built-in radio transceivers 111; the back lamp 12 has a built-in radio transceivers 121; the left-turn signal lamp 13 has a built-in radio transceivers 131; the right-turn signal lamp 14 has a built-in radio transceivers 141; and the lock 15 has a built-in radio transceivers 151.

When a user presses the front-lamp control button 32, a corresponding electrical signal S1a is generated and sent to the microprocessor 6 which in turn retrieves the identification code of the front lamp 11 and sends the identification code along with an activation signal S2 to the radio transceiver 5. The radio transceiver 5 radiates a corresponding radio signal and the radio transceiver 111 of the front lamp 11 receives the radio signal. After the front lamp 11 recognizes from the identification code in the radio signal that it is the target object, the front lamp 11 is turned on or off accordingly.

When a user presses the back-lamp control button 33, a corresponding electrical signal S1b is generated and sent to the microprocessor 6 which in turn retrieves the identification code of the back lamp 12 and sends the identification code along with an activation signal S2 to the radio transceiver 5. The radio transceiver 5 radiates a corresponding radio signal and the radio transceiver 121 of the back lamp 12 receives the radio signal. After the back lamp 12 recognizes from the identification code in the radio signal that it is the target object, the back lamp 12 is turned on or off accordingly.

When a user presses the left-turn-signal-lamp control button 36, a corresponding electrical signal S1d is generated and sent to the microprocessor 6 which in turn retrieves the identification code of the left-turn signal lamp 13 and sends the identification code along with an activation signal S2 to the radio transceiver 5. The radio transceiver 5 radiates a corresponding radio signal and the radio transceiver 131 of the left-turn signal lamp 13 receives the radio signal. After the left-turn signal lamp 13 recognizes from the identification code in the radio signal that it is the target object, the left-turn signal lamp 13 is turned on or off accordingly.

When a user presses right-turn-signal-lamp control button 37, a corresponding electrical signal S1e is generated and sent to the microprocessor 6 which in turn retrieves the identification code of the right-turn signal lamp 14 and sends the identification code along with an activation signal S2 to the radio transceiver 5. The radio transceiver 5 radiates a corresponding radio signal and the radio transceiver 141 of the right-turn signal lamp 14 receives the radio signal. After the right-turn signal lamp 14 recognizes from the identification code in the radio signal that it is the target object, the right-turn signal lamp 14 is turned on or off accordingly.

When a user presses the brightness control button 38, a corresponding electrical signal S1f is sent to the microprocessor 6. Similar to the foregoing description, the radio transceiver 5 radiates a brightness adjustment radio signal. In one embodiment, all lamps 11 to 14 will respond accordingly while in an alternative embodiment, one of the lamp buttons 32, 33, 36, and 37 is operated along with the brightness control button 38 to specify a specific lamp. Usually, each lamp has several brightness levels, and a lamp would cycle through these levels or modes upon receiving the brightness adjustment radio signals.

When a user presses the flash control button 39, a corresponding electrical signal S1g is sent to the microprocessor 6. Similar to the foregoing description, the radio transceiver 5 radiates a flash mode adjustment radio signal. In one embodiment, all lamps 11 to 14 will respond accordingly while in an alternative embodiment, one of the lamp buttons 32, 33, 36, and 37 is operated along with the flash control button 39 to specify a specific lamp. Usually, each lamp has several flash modes, and a lamp would cycle through these modes upon receiving the flash mode adjustment radio signals.

The lock 15 is usually installed on the front fork or the back fork to lock the front or back wheel. When a user presses the lock control button 34, a corresponding electrical signal S1c is generated and sent to the microprocessor 6 which in turn retrieves the identification code of the lock 15 and sends the identification code along with an activation signal S2 to the radio transceiver 5. The radio transceiver 5 radiates a corresponding radio signal and the radio transceiver 151 of the lock 15 receives the radio signal. After the lock 15 recognizes from the identification code in the radio signal that it is the target object, the lock 15 is locked or unlocked accordingly.

After a user presses the lock control button 34, the user has to enter a correct pass code via the numeric key pads 31 three times. Then, the activation signal S2 is sent to the radio transceiver 5 by the microprocessor 6.

The display unit 4, under the control of the microprocessor 6, has a plurality of display areas to show the status of the various accessories. For example, as illustrated in FIG. 1, a front-lamp display area 41 shows the on/off status of the front lamp 11, a back-lamp display area 42 shows the on/off status of the back lamp 12, and a lock display area 43 shows the locked/unlocked status of the lock 15. There is also a numeric display area 44 showing, for example, the current speed of the bicycle 1 and the pass code when it is entered.

The speed sensor 16 is usually installed to monitor either the front wheel or the back wheel. The speed sensor 16 has a built-in radio transceiver 161 which radiates a radio signal for each turn of the wheel to the radio transceiver 5 of the microprocessor 6. Together with information such as the diameter of the wheel, the microprocessor 6 is able to calculate the speed of the bicycle 1 and shows the calculation result on the display unit 4.

The body sensor 17, worn by the bicycle rider, is able to pick up the rider's biological signals such as heart beat, body temperature, etc. These signals are then transmitted to the microprocessor 6 via the body sensor 17's built-in radio transceiver 171. Again, the microprocessor 6 is able to calculate the heart beat rate, etc. and shows the calculation result in the display unit 4.

The reset button 35a, the set button 35b, and the mode button 35c, together with the numeric key pads 31, are used to configure the various parameters of the control device 100 such as the pass code, the diameter of the wheel, etc.

The control device 100 could further comprises an alarm unit 9 connected to and controlled by the microprocessor 6 inside the casing. The alarm unit 9 is for issuing audible alarms when an abnormality has occurred such as the pass code is not entered correctly or when the lock 15 is tampered with.

The control device 100, instead of being installed on the bicycle 1, could also be carried by the bicycle rider. The rider is therefore able to remotely control the accessories of the bicycle 1 as long as the bicycle 1 is within the radio coverage.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. In a bicycle having a front lamp, a back lamp, turn-signal lamps, an electronic lock, a speed sensor, a body sensor and a control device, wherein said control device is an independent device having a display unit and a button set on a front surface of said control device, said button set comprising a plurality of numeric key pads, a front-lamp control button, a back-lamp control button, a reset button, a set button, a mode button, a brightness control button, and a flash control button, said control device comprising a radio transceiver, a microprocessor, a code table, a memory unit and an alarm unit, said microprocessor being connected to and interacted with said display unit and said button set, said memory unit being connected to said microprocessor for storage of data and instructions used in operation of said microprocessor, said radio transceiver being connected to said microprocessor for sending and receiving radio signals to and from said lamps and said speed sensor, said code table being connected to said microprocessor for storage of identification codes of said lamps, said front lamps having a built-in radio transceiver, said back lamp having a built-in radio transceiver; wherein when a user presses on one of said buttons, a corresponding electrical signal is generated and sent to said microprocessor which in turn retrieves an identification code of said lamps and sends said identification code along with an activation signal to said radio transceiver of said control device, said radio transceiver of said control device radiating a corresponding radio signal to turn on or off said lamps.

2. The control device as claimed in claim 1, wherein a correct pass code via said numeric key pads must be entered three times to cause said microprocessor to send activation signal to said radio transceiver of said control device.

3. The control device as claimed in claim 1, wherein said display unit has a plurality of display areas to show status.

4. The control device as claimed in claim 1, wherein said speed sensor is installed to monitor either a front wheel or a back wheel of said bicycle.

5. The control device as claimed in claim 1, wherein said button set further comprises turn-signal lamp control buttons, and said turn-signal lamps are provided with a built-in radio transceiver.

6. The control device as claimed in claim 1, wherein said button set further comprises a lock control button, said lock has a built-in radio transceiver which is connected to said microprocessor for sending and receiving radio signals to and from said electronic lock.

7. The control device as claimed in claim 1, wherein said radio transceiver is connected to said microprocessor for sending and receiving radio signals to and from said body sensor.

\* \* \* \* \*